(12) United States Patent
Uchida et al.

(10) Patent No.: US 9,976,492 B2
(45) Date of Patent: May 22, 2018

(54) ELECTRONIC THROTTLE VALVE

(71) Applicant: DENSO CORPORATION, Kariya, Aichi-pref. (JP)

(72) Inventors: Takuma Uchida, Kariya (JP); Akira Higuchi, Kariya (JP); Yasushi Kawano, Kariya (JP)

(73) Assignee: DENSO CORPORATION, Kariya (JP)

( * ) Notice: Subject to any disclaimer, the term of this patent is extended or adjusted under 35 U.S.C. 154(b) by 159 days.

(21) Appl. No.: 14/994,222

(22) Filed: Jan. 13, 2016

(65) Prior Publication Data
US 2016/0237918 A1 Aug. 18, 2016

(30) Foreign Application Priority Data

Feb. 17, 2015 (JP) .................... 2015-28506

(51) Int. Cl.
*F16K 31/04* (2006.01)
*F02D 9/02* (2006.01)
*F16K 1/22* (2006.01)
*F02D 9/10* (2006.01)

(52) U.S. Cl.
CPC ............... *F02D 9/02* (2013.01); *F02D 9/105* (2013.01); *F02D 9/106* (2013.01); *F16K 1/22* (2013.01); *F16K 31/043* (2013.01)

(58) Field of Classification Search
CPC ........ F02D 9/02; F02D 9/0255; F02D 9/0296; F02D 9/106; F02D 9/107; F02D 9/1065; F02D 9/105; F02D 2009/0296; F16K 1/22; F16K 31/043; F16K 31/047
USPC .................................... 251/129.12, 305, 308
See application file for complete search history.

(56) References Cited

U.S. PATENT DOCUMENTS

| | | | | |
|---|---|---|---|---|
| 5,188,078 A | * | 2/1993 | Tamaki | ................. F02D 9/1065 123/184.61 |
| 8,448,627 B2 | * | 5/2013 | Kondo | .................... F02D 9/105 123/361 |
| 2002/0189584 A1 | | 12/2002 | Tanaka et al. | |

FOREIGN PATENT DOCUMENTS

| JP | H8-200104 A | 8/1996 |
|---|---|---|
| JP | 2001-352701 A | 12/2001 |

* cited by examiner

*Primary Examiner* — Ian Paquette

(57) ABSTRACT

A housing defines a bore in a tubular shape to draw intake air to an engine. A shaft is supported rotationally relative to the housing. A valve is located in the bore and affixed to the shaft. An electric actuator is configured to rotate one end of the shaft. A load generating unit is configured to apply a biasing load onto the shaft from the one end of the shaft toward the bore in a high-temperature state in which a temperature is higher than a predetermined temperature.

13 Claims, 7 Drawing Sheets

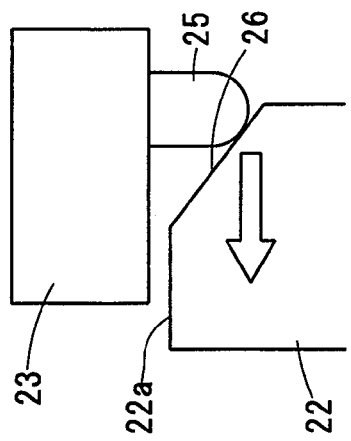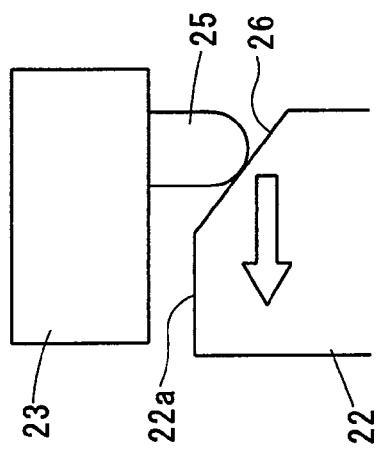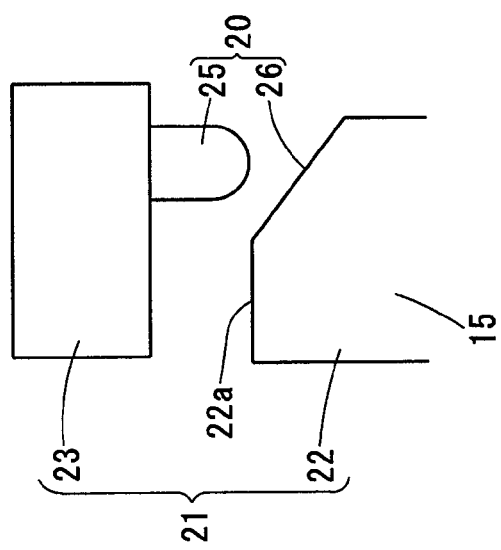

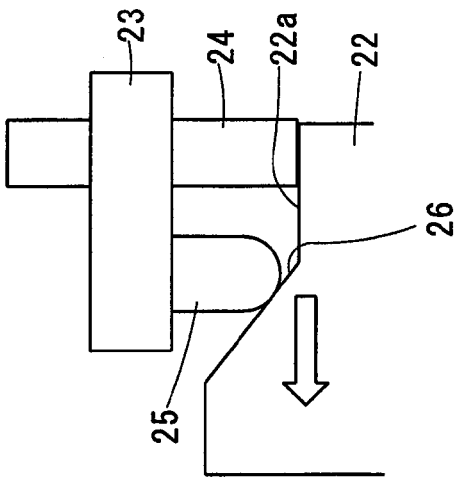
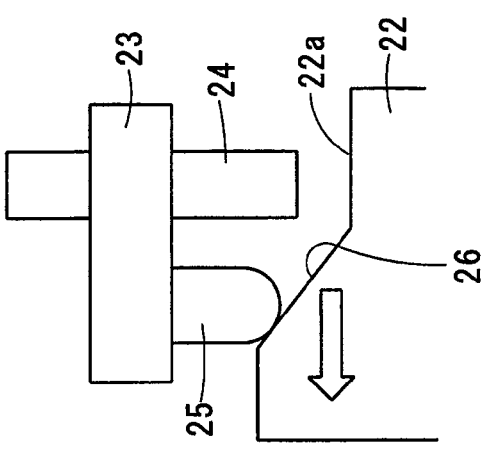
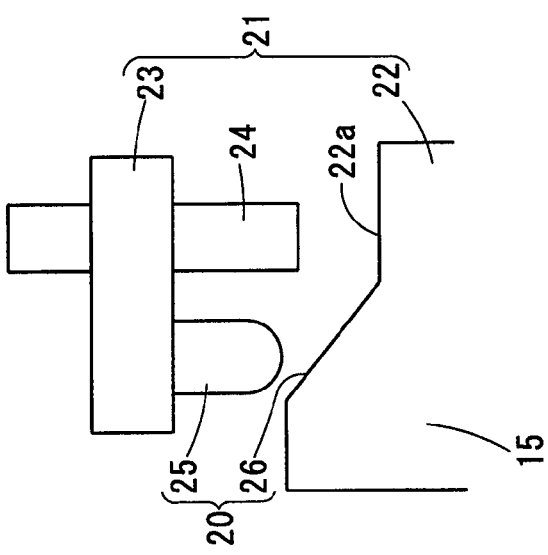

ELECTRONIC THROTTLE VALVE

CROSS REFERENCE TO RELATED APPLICATION

This application is based on reference Japanese Patent Application No. 2015-028506 filed on Feb. 17, 2015, the disclosure of which is incorporated herein by reference.

TECHNICAL FIELD

The present disclosure relates to an electronic throttle device for an intake passage for an internal combustion engine.

BACKGROUND

A known electronic throttle device is configured to rotate a shaft, which is affixed with a valve, by using an electric actuator. For example, Patent Document 1 discloses an electronic throttle device in which a shaft is supported by a housing via a metallic bearing.

An electronic throttle device may be at a high temperature due to, for example, increase in an environmental temperature of the electronic throttle device. In such a state, a valve may make contact with a bore to cause ablation.

PATENT DOCUMENT 1

Publication of unexamined Japanese patent application No. 2002-371866

SUMMARY

It is an object to produce an electronic throttle device configured to enable to reduce ablation in a valve and/or a bore in a high-temperature state.

As follows, a technical issues investigated by inventor(s) will be described. In the following description, a valve gear side relative to a bore center in an axial direction of a shaft is denoted by right, and an opposite direction thereof is denoted by left for convenience of explanation. It is noted that, the right and left directions are irrelevant to a direction in which the electronic throttle device is actually mounted. An electronic throttle device is configured to rotate a shaft, which is affixed with a valve, by using an electric actuator. The shaft extends through a bore. The right side of the shaft is supported by the housing via a ball bearing. The left side of the shaft is supported by the housing via a metallic bearing.

The electronic throttle device may be at a high temperature due to, for example, increase in an environmental temperature of the electronic throttle device. Specifically, the electronic throttle device may be at a high temperature when, for example, a temperature in an engine room increases due to traffic congestion in a broiling weather. A coefficient of linear expansion of the valve and/or the shaft may be higher than a coefficient of linear expansion of the housing. In such a case, when the electronic throttle device is at a high temperature, the right side of the valve may make contact with the bore due to thermal expansion. In this case, the valve may rotate in the state where the valve is in contact with the bore to result in causing ablation. Consequently, rotational friction of the shaft may increase. In addition, the valve and/or the bore may cause damage such as scratch, crack, and/or the like.

The above-described mechanism will be further specifically described with reference to FIG. 7.

(1) When ambient temperature of an electronic throttle device becomes a high temperature, the right side of the valve 4 may first make contact with the bore 1 due to thermal expansion.

(2) When the valve 4 further causes the thermal expansion, the right side of the valve 4 may bias the bore 1. In the present condition, the valve 4 and the bore 1 are in contact with each other. Therefore, the force applied from the valve 4 to bias the bore 1 is apparently converted into a force to bias the right side of the shaft 3 toward the left side. Consequently, an inner ring of a ball bearing 11 may move relative to an outer ring of the ball bearing 11 toward the left side.

Therefore, even when the electronic throttle device is at a high temperature, the inner ring of the ball bearing 11 may move relative to the outer ring side toward the left side. In this way, the mechanism may mitigate biasing of the valve 4 and the bore 1. However, even though this mechanism may mitigate biasing of the valve 4 and the bore 1, the mechanism may still allow the valve 4 to be in contact with the bore 1. Consequently, in the mechanism, ablation may occur when the valve 4 rotates.

According to an aspect of the disclosure, an electronic throttle device comprises a housing defining a bore in a tubular shape to draw intake air to an engine. The electronic throttle device further comprises a shaft supported rotationally relative to the housing. The electronic throttle device further comprises a valve located in the bore and affixed to the shaft. The electronic throttle device further comprises an electric actuator configured to rotate one end of the shaft. The electronic throttle device further comprises a load generating unit configured to apply a biasing load onto the shaft from the one end of the shaft toward the bore in a high-temperature state in which a temperature is higher than a predetermined temperature.

BRIEF DESCRIPTION OF THE DRAWINGS

The above and other objects, features and advantages of the present invention will become more apparent from the following detailed description made with reference to the accompanying drawings. In the drawings:

FIGS. 4A, 4B, and 4C are schematic views showing an operation of a load generating unit according to a second embodiment;

FIGS. 5A, 5B, and 5C are schematic views showing an operation of a load generating unit according to a third embodiment;

DETAILED DESCRIPTION

Embodiment

Figure 1A:
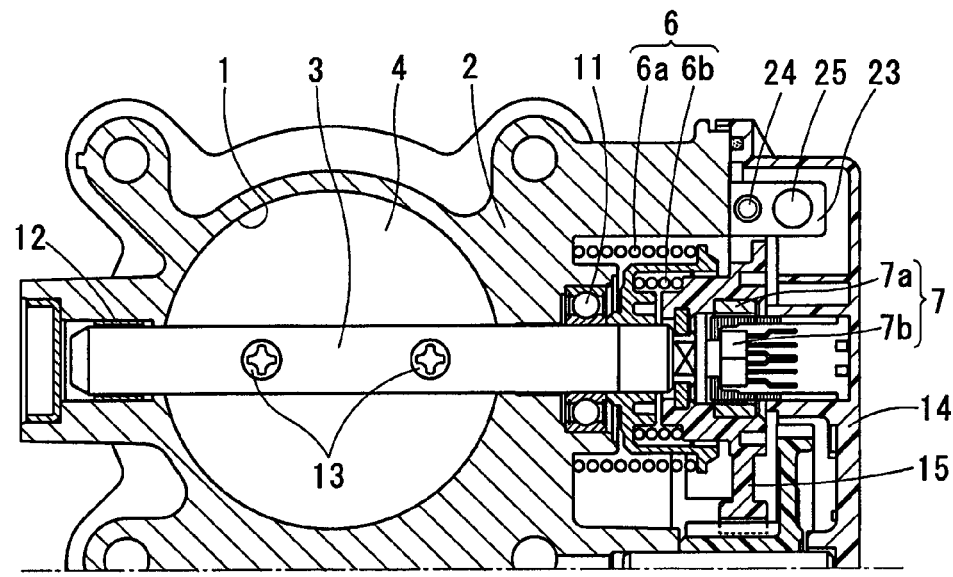
FIG. 1A is a sectional view showing an electronic throttle device according to a first embodiment.
Figure 1B:
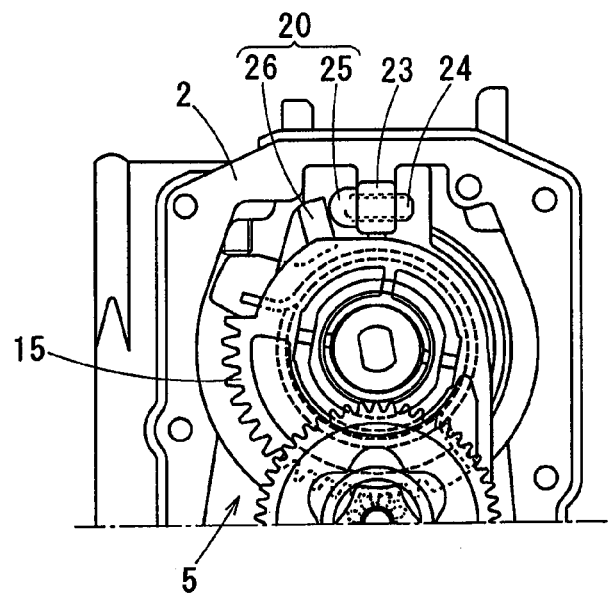
FIG. 1B is an explanatory view of an electric actuator according to the first embodiment.

As follows, embodiments of the present disclosure will be described with reference to drawings. The embodiments are detailed examples and do not limit the present disclosure.

First Embodiment

First embodiment will be described with reference to FIGS. 1A to 3B. An electronic throttle device is equipped to an intermediate portion of an intake passage for an internal combustion engine. The electronic throttle device is configured to control an amount of intake air drawn into the engine. The electronic throttle device includes a housing 2, a shaft 3, a valve 4, and an electric actuator. The housing 2 forms a tubular bore 1 to draw intake air into the engine. The shaft 3 is rotationally supported by the housing 2. The valve 4 is located in the bore 1 and fixed to the shaft 3. The electric actuator actuates one end (right-side end) of the shaft 3 to rotate the shaft 3.

The electric actuator includes an electric motor, a reduction gear 5, a biasing force producing unit 6, and a rotation angle sensor 7. The electric motor converts an electric power into a rotational force. The reduction gear 5 amplifies a rotary torque, which is generated by the electric motor, and applies the amplified rotary torque onto the shaft 3. The biasing force producing unit 6 returns the shaft 3 and the valve 4 to a predetermined angular position. The rotary angle sensor 7 detects a rotary angle of the shaft 3 thereby to detect an opening of the valve 4.

Subsequently, the above-described components will be described. The housing 2 has an interior defining the bore 1, which forms a part of an intake passage. The housing 2 has a mounting portion on which an electric actuator is mounted. The housing 2 is formed of a lightweight metallic material and/or a resin material. In one example, the housing 2 is formed of aluminum alloy and/or the like.

The housing 2 has a shaft insertion hole in which the shaft 3 is inserted. The shaft 3 extends in a horizontal direction of FIG. 1A to pass across the bore 1. The shaft 3 is inserted in a direction perpendicular to a streamline direction inside the bore 1. The streamline direction is along a center axis (bore axis) of the bore 1. Intake air flows along the bore axis. A ball bearing 11 is located at an interior of a right side of the shaft insertion hole. The ball bearing 11 rotationally supports the right side of the shaft 3. A metallic bearing 12 is located at an interior of a left side of the shaft insertion hole. The metallic bearing 12 rotationally supports the left side of the shaft 3.

The shaft 3 is a bar formed of a metallic materials such as a ferrous material in a columnar shape. The shaft 3 is supported by both the ball bearing 11 and the metallic bearing 12 and is rotational integrally with the valve 4. The valve 4 is a butterfly-type rotary valve formed of a metallic material such as aluminum, brass, and/or the like in a flat disk shape. The valve 4 is fixed to the shaft 3 and located in the bore 1.

Specifically, the shaft 3 has a slit for mounting the valve 4. The valve 4 is inserted in the slit and is fixed to the shaft 3. In the example of FIG. 1A, two screws 13 are used as a fixing unit to fix the valve 4 to the shaft 3. The screws 13 are screwed to fix the valve 4, and thereafter, a treatment is implemented on the screws 13 not to loose the screws 13. The treatment is, for example, application of a compressive force to cause plastic deformation in the screws 13, application of an adhesive material, welding, and/or the like. In this way, the screws 13 are processed to maintain stable screwing force for a long period.

The electric actuator is mounted to the housing 2. The housing 2 is equipped with a cover 14 by using a screw and/or the like. The cover 14 is detachable to the housing 2. An electric motor is accommodated in a motor accommodation chamber formed in the housing 2. A reduction gear 5, the biasing force producing unit 6, and the like are accommodated in a gear chamber. The gear chamber is a space formed between the housing 2 and the cover 14.

The electric motor may be a generally-known direct-current motor. The electric motor changes a rotational direction in response to change in a direction of electricity supply. The electric motor produces a rotary torque according to an amount of electricity supply. The electric motor is inserted into the motor accommodation chamber and thereafter fixed to the housing 2 by using a screw and/or the like.

The reduction gear 5 is a gear-type reduction gear device including a combination of multiple gears to decelerate rotation speed of the electric motor thereby to increase a driving torque. The reduction gear 5 transmits the increased driving torque to the shaft 3. More specifically, the reduction gear 5 includes a motor gear (pinion gear), an intermediate gear, and a valve gear 15 (final gear). The motor gear is rotated integrally with the electric motor. The intermediate gear is rotated by the motor gear. The valve gear 15 is rotated by the intermediate gear. Thus, the valve gear 15 rotates integrally with the shaft 3 and the valve 4.

The motor gear is an outer-teeth gear having a small diameter. The motor gear is fixed to an output axis of the electric motor. The intermediate gear is a double gear including a large-diameter gear and a small-diameter gear, which are coaxial with each other. The intermediate gear is rotationally supported with a support axis, which is supported by the housing 2 and the cover 14. The large-diameter gear regularly meshes with the motor gear. The small-diameter gear regularly meshes with the valve gear 15. The valve gear 15 is a large-diameter outer-teeth gear fixed to a right end of the shaft 3. The valve gear 15 has gear teeth (outer teeth) equipped selectively (only) in a rotational range for rotating the valve 4.

The biasing force producing unit 6 is to hold the valve 4 at an intermediate position between a full-close position and a full-open position, when electric current, which is supplied to the electric motor, is terminated. In this way, the biasing force producing unit 6 enables the vehicle to perform evacuation travel when the electric current is terminated. The biasing force producing unit 6 includes a return spring 6a and a default spring 6b, which are combined with each other. The return spring 6a applies a biasing force (valve-closing force) in a direction to close the valve 4. The default spring 6b applies a biasing force (valve-opening force) in the direction to open the valve 4.

The rotary angle sensor 7 is a throttle position sensor to detect a rotary angle of the shaft 3 thereby to detect an opening position of the valve 4. The rotary angle sensor 7 sends an opening signal to an engine control unit (ECU) according to the detected angle of the shaft 3. Specifically, the rotary angle sensor 7 is a magneto-type sensor to detect a relative rotation between two components in a non-contact manner. The rotary angle sensor 7 includes a magnetic circuit unit 7a and a magnetism detection unit 7b. The magnetic circuit unit 7a is substantially in a tubular shape. The magnetic circuit unit 7a is inserted in an interior of the valve gear 15 and is rotational integrally with the shaft 3. The magnetism detection unit 7b is mounted on the cover 14 and is in non-contact with the magnetic circuit unit 7a. The magnetism detection unit 7b includes a hall IC device to produce a voltage signal (output signal) sent to the ECU. The ECU is a generally-known electronic control unit including a microcomputer. The ECU is configured to implement a feedback control on the electric motor such that an actual opening position of the valve 4, which is detected with the rotary angle sensor 7, coincides with a target opening position, which is determined according to a position of an accelerator pedal.

The electronic throttle device includes a load generating unit 20 to apply a biasing load onto the shaft 3 from the right side (one end side) of the shaft 3 toward the left side (bore 1 side) of the shaft 3. The load generating unit 20 applies the biasing load in a high-temperature state in which a temperature is greater than a predetermined temperature. The predetermined temperature may be a temperature at which the right side of the valve 4 causes a thermal expansion to make contact with the bore 1 in an electronic throttle device having a conventional configuration. More specifically, the predetermined temperature may be, for example, 60 degrees Celsius. The load generating unit 20 is equipped to a full close stopper 21, which is to regulate the full-close position of the valve 4.

As follows, the full close stopper 21 will be described. The full close stopper 21 is a mechanical stopper mechanically to regulate a rotational limit of the valve 4 in the closing direction. The full close stopper 21 employs an abutment structure between a rotational member and a stationary member. Specifically, the full close stopper 21 includes a movable-side stopper 22 (rotational member) and a stationary-side stopper 23 (stationary member). The movable-side stopper 22 (rotational member) is equipped to the valve gear 15 to be projected radially outward. The stationary-side stopper 23 (stationary member) is formed as a part of the housing 2. When the valve 4 rotates in the closing direction and when the movable side stopper 22 makes contact with the stationary-side stopper 23, the full close stopper 21 regulates the full-close position of the valve 4.

The stationary-side stopper 23 of the present first embodiment is equipped with an adjuster screw 24 for adjusting the full-close position of the valve 4. The adjuster screw 24 is an adjusting device screwed into the stationary-side stopper 23. The adjuster screw 24 has a tip end, which is configured to make contact with the movable-side stopper 22 thereby to regulate the full-close position of the valve 4. The present configuration enables to control the full-close position of the valve 4 by adjusting an amount of screwing of the adjuster screw 24 relative to the stationary-side stopper 23.

Subsequently, a configuration of the load generating unit 20 will be described. The load generating unit 20 is equipped to the full-open stopper. The load generating unit 20 is a device to actuate the valve 4 in the closing direction such that the movable-side stopper 22 is biased onto the stationary-side stopper 23. The load generating unit 20 actuates the valve 4 in this way when the right side of the shaft 3 is extended due to thermal expansion. Thus, the load generating unit 20 causes application of a load (left-side load) toward the left side thereby to cancel expansion of the shaft 3 toward the right side. The load generating unit 20 includes a pin 25 and an inclined surface 26. The pin 25 is projected from the stationary-side stopper 23 in the rotational direction of the valve gear 15. The inclined surface 26 is formed on the movable-side stopper 22. The inclined surface 26 is configured to make contact with the pin 25 when the shaft 3 causes thermal expansion to extend. When being in the high-temperature state and when being in a rotational range around the full-close position, the pin 25 biases the inclined surface 26 thereby to apply a biasing load onto the right side of the shaft 3 toward the left side.

According to the first embodiment, the pin 25 is located on the right side of the adjuster screw 24. The movable-side stopper 22 has a contact surface 22a, which is a portion to make contact with the adjuster screw 24. Similarly to the pin 25, the inclined surface 26 is located on the right side of the contact surface 22a. The pin 25 has a tip end in a curved shape to enable to slide the tip end on the inclined surface 26 smoothly, in a state where the tip end of the pin 25 is in contact with the inclined surface 26. Specifically, the tip end of the pin 25 has a curved surface such as a hemispheric surface. The pin 25 is a component formed of a metallic material such as a ferrous material. Alternatively, the pin 25 is a component formed of a hard resin material. The pin 25 is affixed to the housing 2 by press-fitting, crimping, screwing, adhesion, and/or the like.

Figure 3A:
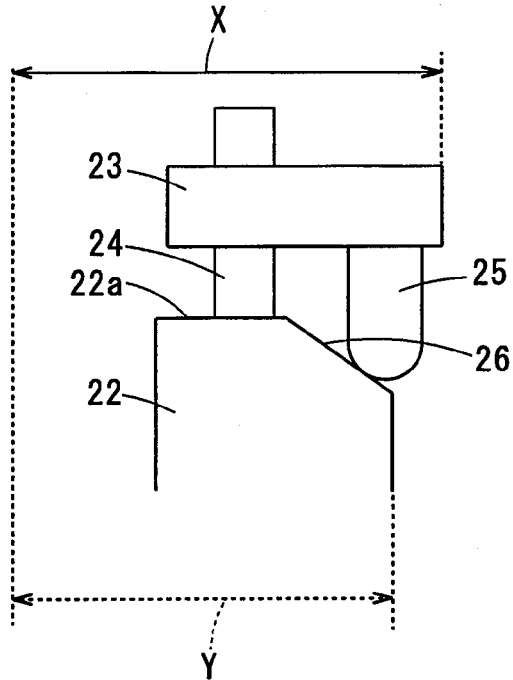
FIG. 3A is a schematic view showing the load generating unit in a normal temperature state.
Figure 3B:
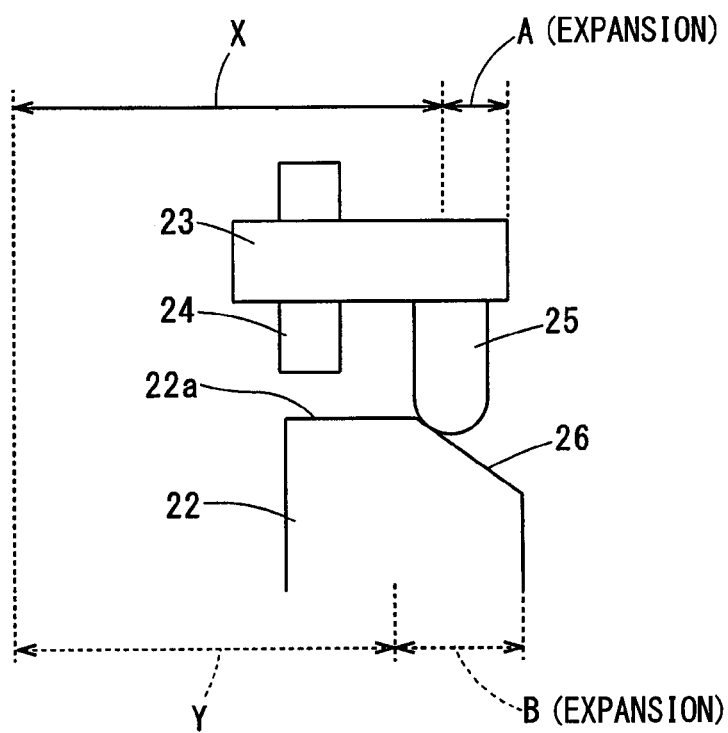
FIG. 3B is a schematic view showing the load generating unit in a high-temperature state, according to the first embodiment.

Subsequently, a difference between a normal temperature state (ambient temperature state) and the high-temperature state will be described. In the normal temperature state, the electronic throttle device is at a temperature lower than the predetermined temperature. FIG. 3A shows a state in which the valve 4 in the normal temperature state is in the full-close position. When the valve 4 is in the full-close position, the end surface of the movable-side stopper 22 in the rotational direction makes contact with the end surface of the adjuster screw 24. In the normal temperature state, even in the full-close position and even in a state in which the inclined surface 26 makes contact with the pin 25, the pin 25 is configured not to apply a biasing load onto the right-side (one end side) of the shaft 3 toward the left side (bore 1 side). In FIGS. 3A and 3B, an axial length X is a distance from a ball center of the ball bearing 11 to a tip end of the stationary-side stopper 23 in the axial direction in the normal temperature state. In addition, an axial length Y is a distance from the ball center of the ball bearing 11 to a tip end of the movable-side stopper 22 in the axial direction in the normal temperature state.

When a temperature of the electronic throttle device increases to the high temperature, the axial length from the ball center of the ball bearing 11 to the tip end of the stationary-side stopper 23 increases. In addition, the axial length from the ball center of the ball bearing 11 to the tip end of the movable-side stopper 22 also increases. When the normal temperature state changes to the high-temperature state, the axial length from the ball center of the ball bearing 11 to the tip end of the stationary-side stopper 23 increases by an expansion A. In addition, the axial length from the ball center of the ball bearing 11 to the tip end of the movable-side stopper 22 increases by an expansion B.

It is noted that, the housing 2 is different from both the shaft 3 and the valve gear 15 in a coefficient of linear expansion. Therefore, as shown in FIG. 3B, the expansion B of the movable-side stopper 22 toward the right side becomes greater than the expansion A of the stationary-side stopper 23 toward the right side (A<B). That is, in the high-temperature state, the linear expansion of both the shaft 3 and the valve gear 15 becomes greater than the linear expansion of the housing 2. Consequently, as shown in FIG. 3B, when the normal temperature state changes to the high-temperature state, the inclined surface 26 moves toward the right side relative to the pin 25 with reference to the position of the pin 25.

Subsequently, an example to actuate the valve 4 to the full-close position in the high-temperature state will be described.

Figure 2C:
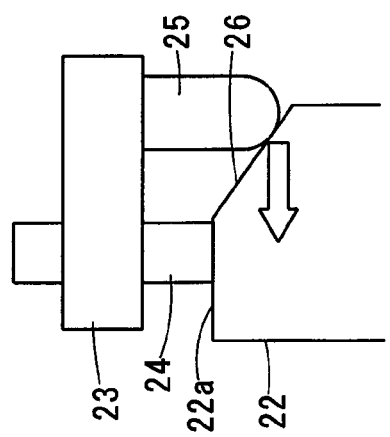
FIGS. 2A, 2B, and 2C are schematic views showing an operation of a load generating unit according to the first embodiment.
Figure 2B:
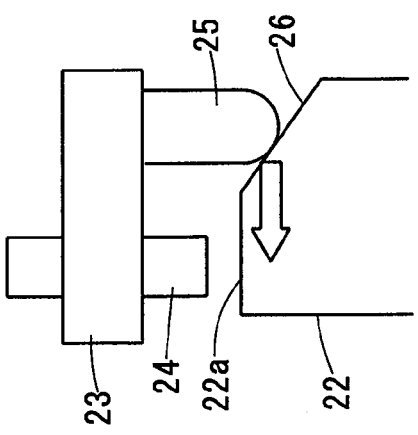
Figure 2A:
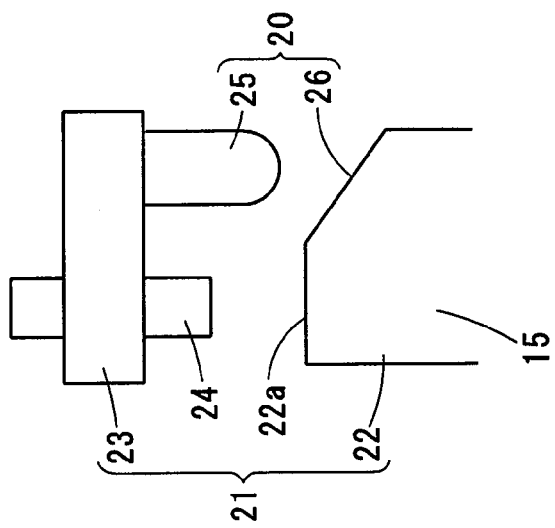

(i) FIG. 2A shows the device in the high-temperature state. In FIG. 2A, the valve gear 15 is rotated in the closing direction in order to actuate the valve 4 to the full-close position.

(ii) Subsequently, in FIG. 3B, the inclined surface 26 first makes contact with the pin 25 in a state where the contact surface 22a of the movable-side stopper 22 does not make contact with the end surface of the adjuster screw 24.

(iii) In the state where the inclined surface 26 is in contact with the pin 25, the valve gear 15 is further actuated in the closing direction. Thus, as shown in FIG. 2B, the inclined surface 26 is biased onto the pin 25. In this way, a force to move the inclined surface 26 away from the pin 25 occurs. That is, this force causes a biasing load to bias the right side of the shaft 3 toward the left side.

(iv) Subsequently, the valve gear 15 is further actuated in the closing direction. Thus, as shown in FIG. 2C, the force applied from the pin 25 onto the inclined surface 26 increases. In this way, the force to move the inclined surface 26 away from the pin 25 further increases. That is, the biasing load to bias the right side of the shaft 3 to the left side further increases. Subsequently, the contact surface 22a of the movable-side stopper 22 makes contact with the end surface of the adjuster screw 24. In the present state, the biasing load toward the left side is applied onto the right side of the shaft 3. Further in the present state, the valve 4 stops at the full-close position.

Effect of First Embodiment

In the electronic throttle device of the first embodiment, when the electronic throttle device is in the high-temperature state and when the valve 4 rotates around the full-close position, the load generating unit 20 applies the load directed toward the left side onto the right side of the shaft 3. Therefore, the present configuration enables to restrict the right side of the valve 4 from making contact with bore 1 when the valve 4 rotates around the full-close position, even when the electronic throttle device is in the high temperature state.

The present configuration enables to avoid contact between the right side of the valve 4 and the bore 1 when the valve 4 rotates around the full-close position even in the high-temperature state. Therefore, the present configuration enables to avoid ablation when the valve 4 rotates in the high-temperature state. The present configuration may avoid ablation caused in the high-temperature state in this way. Therefore, the present configuration may avoid increase in rotational friction of the shaft 3 due to ablation caused in the high-temperature state. In addition, the present configuration may avoid damage such as scratch and/or crack in the valve 4 and/or the housing 2 due to ablation caused in the high-temperature state. Consequently, the present configuration may enable to enhance reliability of the electronic throttle device.

Second Embodiment

Second embodiment will be described with reference to FIGS. 4A, 4B, and 4C. In the first embodiment, the adjuster screw 24 is equipped to the full close stopper 21. To the contrary, the present second embodiment may omit the adjuster screw 24. In the present configuration, the contact surface 22a of the movable-side stopper 22 makes contact directly with the stationary-side stopper 23, which is a part of the housing 2. In this way, the present configuration regulates the full-close position of the valve 4. The configuration of the second embodiment may produce an operation effect similarly to the first embodiment. In addition, the second embodiment omits the adjuster screw 24 thereby to reduce of the number of components and to reduce a manufacturing cost.

Third Embodiment

Third embodiment will be described with reference to FIGS. 5A, 5B, and 5C. In the first embodiment, the pin 25 is equipped on the right side of the adjuster screw 24. In addition, in the first embodiment, the inclined surface 26 of the movable-side stopper 22 is also formed on the right side of the contact surface 22a. To the contrary, according to the present third embodiment, the pin 25 is equipped on the left side of the adjuster screw 24. In addition, the inclined surface 26 of the movable-side stopper 22 is also formed on the left side of the contact surface 22a. The configuration of the third embodiment may produce an operation effect similarly to the first embodiment.

Fourth Embodiment

Figure 6A:
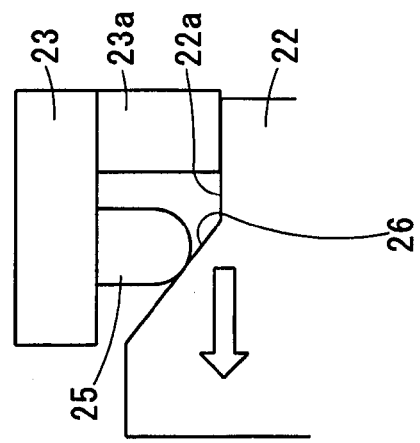
FIGS. 6A, 6B, and 6C are schematic views showing an operation of a load generating unit according to a fourth embodiment.
Figure 6B:
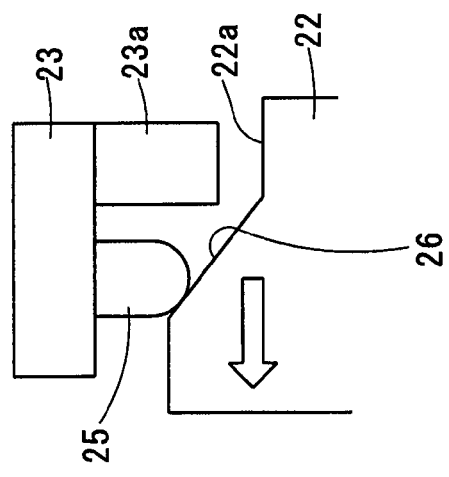
Figure 6C:
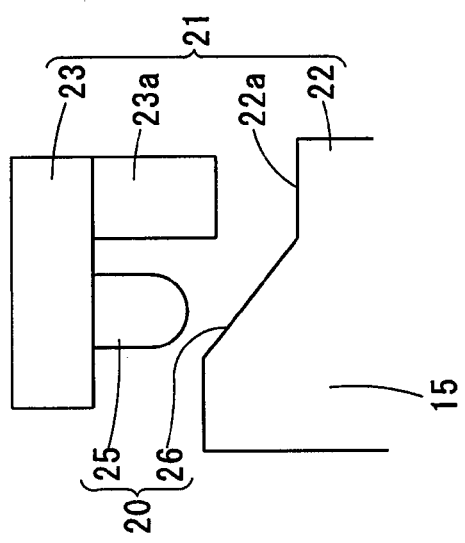
Figure 7:
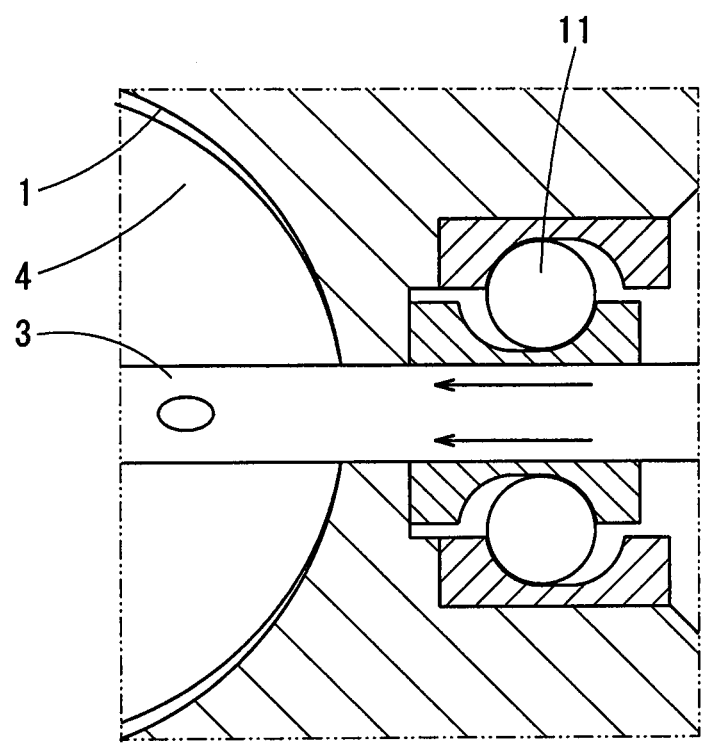
FIG. 7 is a schematic view showing a valve and a bore in a high-temperature state according to a comparative example.

Fourth embodiment will be described with reference to FIGS. 6A, 6B, and 6C. In the third embodiment, the adjuster screw 24 is equipped on the right side of the pin 25. To the contrary, according to the present fourth embodiment, the adjuster screw 24 on the right side of the pin 25 is omitted. In addition, the shape of a part of the stationary-side stopper 23 is modified instead of the omitted adjuster screw 24. Specifically, an extended portion 23a, which is longer than the pin 25, is equipped to the stationary-side stopper 23. In addition, a tip end of the extended portion 23a is configured to make contact with the contact surface 22a of the movable-side stopper 22. The configuration of the third embodiment may produce an operation effect similarly to the first embodiment. In addition, the third embodiment omits the adjuster screw 24 thereby to reduce of the number of components and to reduce a manufacturing cost.

Variation

In the above embodiments, the load generating unit 20 is equipped to the full close stopper 21. It is noted that, the disclosure is not limited to those in the embodiments. For example, the load generating unit 20 may be equipped between the cover 14 and the valve gear 15 to push back the shaft 3 by the expansion of the shaft 3.

As described above, the electronic throttle device of the present disclosure includes the load generating unit. The load generating unit applies the biasing load onto the right side (one end side) of the shaft toward the left side (bore side) at a high temperature. In this way, the load generating unit operates to avoid contact between the valve and the bore even when the electronic throttle device is at a high temperature. Therefore, the configuration may avoid ablation caused by rotation of the valve in a state where the valve is in contact with the bore.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An electronic throttle device comprising:
a housing defining a bore in a tubular shape to draw intake air to an engine;
a shaft supported rotationally relative to the housing;
a valve located in the bore and affixed to the shaft;
an electric actuator including a valve gear fixed to one end of the shaft and configured to rotate the one end of the shaft; and
a load generating unit configured to apply a biasing load onto the shaft from the one end of the shaft toward the bore in a high-temperature state in which a temperature is higher than a predetermined temperature, wherein
the load generating unit is configured to apply the biasing load correspondingly to a difference among a linear expansion of the housing, a linear expansion of the shaft, and a linear expansion of the valve gear caused correspondingly to a difference between the temperature and the predetermined temperature.

2. The electronic throttle device according to claim 1, wherein
the electric actuator includes an electric motor and a reduction gear,
the electric motor is configured to convert an electric power into a rotational force,
the reduction gear is configured to amplify a rotational torque, which is generated by the electric motor, and to apply the amplified rotational torque to the shaft,
the reduction gear includes the valve gear,
the electronic throttle device further comprising:
a full close stopper configured to regulate a full-close position of the valve, wherein
the full close stopper includes a movable-side stopper and a stationary-side stopper,
the movable-side stopper is equipped to the valve gear,
the stationary-side stopper is equipped to the housing,
the full close stopper is configured to regulate the full-close position of the valve when the valve rotates in a closing direction and when the movable-side stopper makes contact with the stationary-side stopper, and
the load generating unit is equipped to the full close stopper.

3. The electronic throttle device according to claim 2, wherein
the load generating unit includes a pin projected from the stationary-side stopper in a rotational direction of the valve gear,
the load generating unit has an inclined surface, which is formed on the movable-side stopper and configured to make contact with the pin when the one end of the shaft moves toward the valve gear due to thermal expansion, and
the inclined surface is configured to be biased onto the pin to apply the biasing load onto the one end of the shaft toward the bore when being in a rotational range around the full-close position and when being in the high-temperature state.

4. The electronic throttle device according to claim 3, wherein
the inclined surface is configured not to apply the biasing load toward the bore when being at the full-close position and when being in a normal temperature state, in which the temperature is lower than the predetermined temperature, even in a state in which the inclined surface makes contact with the pin.

5. An electronic throttle device comprising:
a housing defining a bore in a tubular shape to draw intake air to an engine;
a shaft supported rotationally relative to the housing;
a valve located in the bore and affixed to the shaft;
an electric actuator configured to rotate one end of the shaft; and
a load generating unit configured to apply a biasing load onto the shaft from the one end of the shaft toward the bore in a high-temperature state in which a temperature is higher than a predetermined temperature, wherein
the electric actuator includes an electric motor and a reduction gear,
the electric motor is configured to convert an electric power into a rotational force,
the reduction gear is configured to amplify a rotational torque, which is generated by the electric motor, and to apply the amplified rotational torque to the shaft,
the reduction gear includes a valve gear fixed to the one end of the shaft,
the electronic throttle device further comprising:
a full close stopper configured to regulate a full-close position of the valve, wherein
the full close stopper includes a movable-side stopper and a stationary-side stopper,
the movable-side stopper is equipped to the valve gear,
the stationary-side stopper is equipped to the housing,
the full close stopper is configured to regulate the full-close position of the valve when the valve rotates in a closing direction and when the movable-side stopper makes contact with the stationary-side stopper,
the load generating unit is equipped to the full close stopper,
the load generating unit includes a pin projected from the stationary-side stopper in a rotational direction of the valve gear,
the load generating unit has an inclined surface, which is formed on the movable-side stopper and configured to make contact with the pin when the one end of the shaft moves toward the valve gear due to thermal expansion, and
the inclined surface is configured to be biased onto the pin to apply the biasing load onto the one end of the shaft toward the bore when being in a rotational range around the full-close position and when being in the high-temperature state.

6. The electronic throttle device according to claim 5, wherein
the inclined surface is configured not to apply the biasing load toward the bore when being at the full-close position and when being in a normal temperature state, in which the temperature is lower than the predetermined temperature, even in a state in which the inclined surface makes contact with the pin.

7. An electronic throttle device comprising:
a housing defining a bore in a tubular shape to draw intake air to an engine;
a shaft supported rotationally relative to the housing;
a valve located in the bore and affixed to the shaft;
an electric actuator configured to rotate one end of the shaft; and
a load generating unit configured to apply a biasing load onto the shaft from the one end of the shaft toward the bore in a high-temperature state in which a temperature is higher than a predetermined temperature, wherein
the load generating unit is configured to apply the biasing load in a state where an axis of the shaft is perpendicular relative to a direction of gravitational force.

8. The electronic throttle device according to claim 7, wherein
the load generating unit is affixed to the housing.

9. The electronic throttle device according to claim 7, wherein
the load generating unit includes a pin projected from the stationary-side stopper in a rotational direction of the valve gear.

10. The electronic throttle device according to claim 9, wherein
the pin is affixed to the housing by press-fitting, crimping, screwing, or adhesion.

11. The electronic throttle device according to claim 7, wherein
the electric actuator includes an electric motor and a reduction gear,
the electric motor is configured to convert an electric power into a rotational force,
the reduction gear is configured to amplify a rotational torque, which is generated by the electric motor, and to apply the amplified rotational torque to the shaft,
the reduction gear includes a valve gear fixed to the one end of the shaft,
the electronic throttle device further comprising:
a full close stopper configured to regulate a full-close position of the valve, wherein
the full close stopper includes a movable-side stopper and a stationary-side stopper,
the movable-side stopper is equipped to the valve gear,
the stationary-side stopper is equipped to the housing,
the full close stopper is configured to regulate the full-close position of the valve when the valve rotates in a closing direction and when the movable-side stopper makes contact with the stationary-side stopper, and
the load generating unit is equipped to the full close stopper.

12. The electronic throttle device according to claim 11, wherein
the load generating unit includes a pin projected from the stationary-side stopper in a rotational direction of the valve gear,
the load generating unit has an inclined surface, which is formed on the movable-side stopper and configured to make contact with the pin when the one end of the shaft moves toward the valve gear due to thermal expansion, and
the inclined surface is configured to be biased onto the pin to apply the biasing load onto the one end of the shaft toward the bore when being in a rotational range around the full-close position and when being in the high-temperature state.

13. The electronic throttle device according to claim 12, wherein
the inclined surface is configured not to apply the biasing load toward the bore when being at the full-close position and when being in a normal temperature state, in which the temperature is lower than the predetermined temperature, even in a state in which the inclined surface makes contact with the pin.

* * * * *